June 29, 1926.　　　　　W. C. CARR　　　　　1,590,496
INDUSTRIAL TRUCK
Filed August 31, 1923　　3 Sheets-Sheet 1
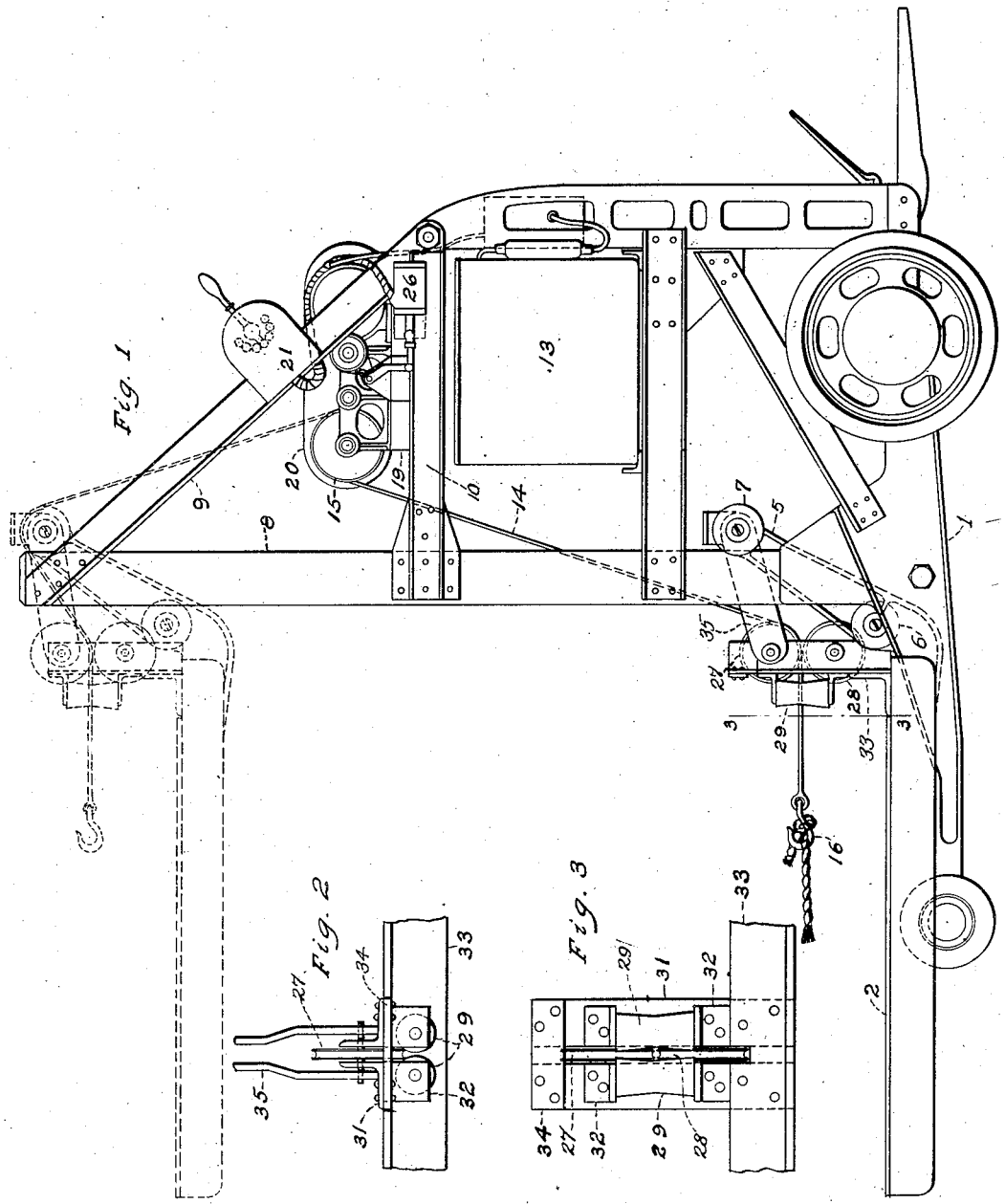
INVENTOR
WILLIAM C. CARR
By Popp and Powers
ATTORNEY June 29, 1926.  
W. C. CARR  
INDUSTRIAL TRUCK  
Filed August 31, 1923   3 Sheets-Sheet 2

1,590,496

INVENTOR  
WILLIAM C. CARR  
BY Popp and Powers  
ATTORNEY

June 29, 1926.
W. C. CARR
INDUSTRIAL TRUCK
Filed August 31, 1923    3 Sheets-Sheet 3
1,590,496
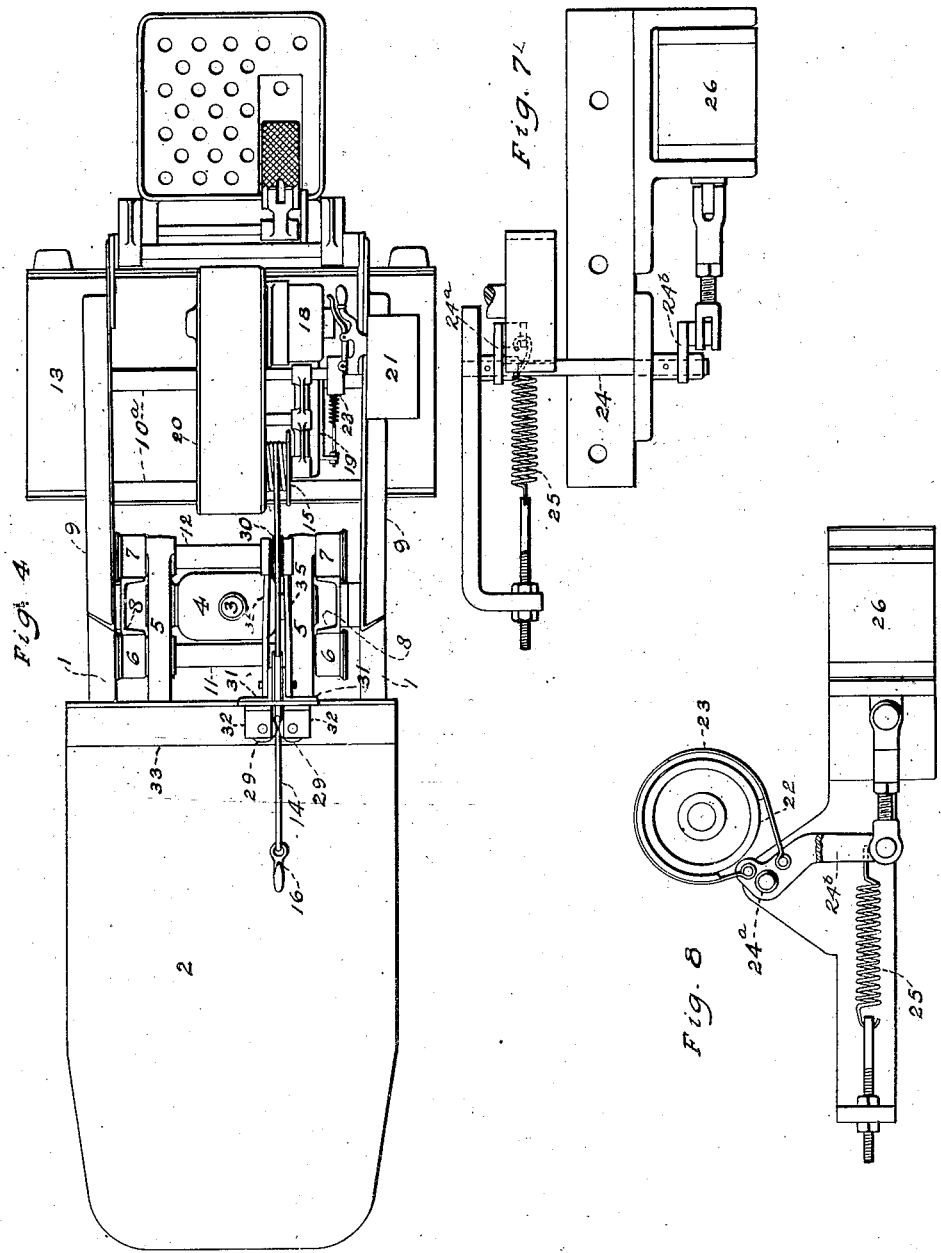
INVENTOR
WILLIAM C. CARR
BY Popp and Powers
ATTORNEY Patented June 29, 1926.

1,590,496

UNITED STATES PATENT OFFICE.

WILLIAM C. CARR, OF BUFFALO, NEW YORK, ASSIGNOR TO THE AUTOMATIC TRANSPORTATION COMPANY, OF BUFFALO, NEW YORK, A CORPORATION OF ARIZONA.

INDUSTRIAL TRUCK.

Application filed August 31, 1923. Serial No. 660,382.

This invention relates to improvements in industrial trucks such as are provided with load supporting platforms and are used in manufacturing establishments for the quick and easy transport of objects or materials from one point to another.

The principal obect of the invention is to provide an industrial truck which may be used with great facility for handling and moving heavy and bulky pieces such as very large castings, thereby to effect substantial economy of time and labor, and which embodies simple and certain mechanism for the purpose in view.

The invention utilizes a truck of the tiering or lifting type in which the load carrying platform may be raised or lowered to any desired elevation within a prescribed range of vertical movement and consists generally in novel features of relation and combination involving the load carrying platform, a load handling cable, and guide means and operating mechanism for the cable, the organization being such that the cable is immediately available in any position of the plaftorm for moving the load either from an adacent support upon the platform or from the platform upon an adacent support.

An industrial truck in which the features of the invention are incorporated is illustrated in the accompanying drawings, wherein:

Figure 1 is a side elevation.

Figure 2 is a plan view of the cable guiding elements mounted on the lifting platform.

Figure 3 is a section on the line 3—3 of Figure 1.

Figure 4 is a plan view of the truck, the upper bearing for the platform elevating screw being omitted to promote clearness of illustration.

Figure 7 is a plan view showing details of the brake incorporated with the cable winding mechanism.

Figure 8 is a side elevation of the brake shown in Figure 7.

Figure 5:
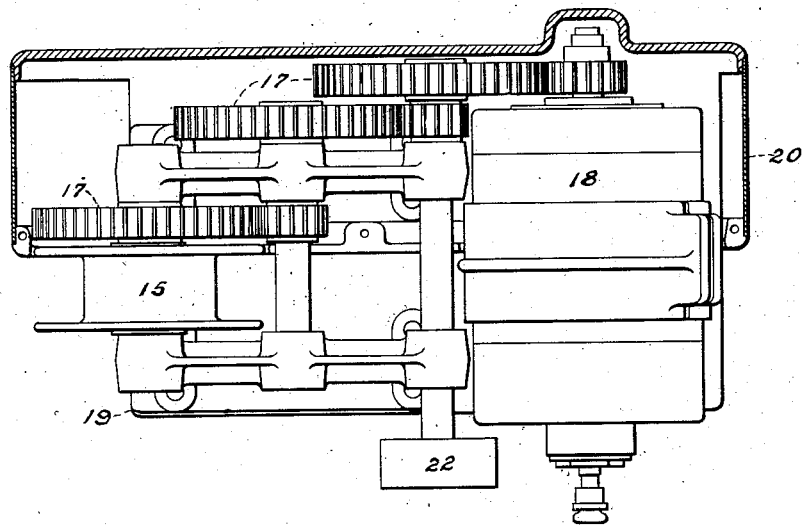
Figure 5 is a plan view of the cable winding mechanism.
Figure 6:
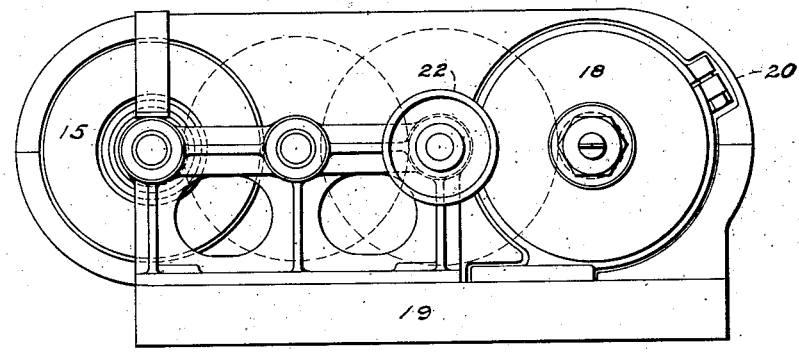
Figure 6 is a side elevation thereof.

The features of the invention are shown in connection with a tiering truck of the general construction disclosed in my Patent No. 1,407,124 issued February 21, 1922, and which includes a wheeled base 1 and a vertically movable load carrying platform 2. The vertical movements of the platform 2 are produced by the co-operation of a rotatable vertical screw 3 and a nut 4 mounted thereon. The nut 4 is connected to a pair of cantilever arms 5 secured to and projecting rearward from the platform 2 which is guided and supported in its vertical movements as effected by the nut 4 by the co-operation of front and rear rollers 6 and 7 with upright guide rails 8 secured to the base 1 and between which the screw 3 is arranged. The rails 8 provide support for the bearings in which the ends of the screw 3 are journalled and are braced to the frame of the truck by diagonal members 9 and horizontal members 10. The rollers 6 and 7 are mounted in pairs on transverse shafts 11 and 12 journalled in the arms 5, the front rollers 6 which engage the front faces of the rails 8 being preferably arranged at a lower elevation than the rear rollers 7 which engage the rear faces of said rails. The truck may be propelled and the screw 3 operated by suitable motors (not shown), these being preferably electric motors controlled in the usual manner and supplied with current from a battery 13.

The transfer of the load to or from the platform 2 is accomplished by means of a cable 14 which is wound upon or payed out from an operating drum 15 and may be connected to the load in any suitable manner, for example, as by means of a hook 16 provided at its free end for engagement with a sling encircling the load. The drum 15 is operated by suitable reducing gearing 17 from an electric motor 18 and the bearings which carry the shafts of the drum, the elements of the gearing 17 and the motor 18 are preferably mounted upon a supporting plate 19 which is secured upon bars 10ª extending between horizontal brace members 10, the gear elements being preferably enclosed in a suitable casing 20 secured to the plate 19. The drum may be rotated in either direction and for this purpose the motor 18 is preferably reversible, its operation being regulated by a controller 21 which may be of any suitable construction and is conveniently mounted on one of the diagonal brace members 9. In order to arrest the rotation of the drum 15 when the power has been cut off a suitable automatic brake is provided which includes a brake drum 22 mounted on the projecting end of the shaft of one of the elements of the gearing 17 and engageable by a brake band 23 which is applied and released by the operation of a rock shaft 24 in the well-known manner. The shaft 24 carries a two-armed lever 24ᵃ which is connected to the brake band in the well-known manner and is also connected to a spring 25 by which the brake is applied; said shaft also carries at its outer end a second lever 24ᵇ which is connected at its lower end to the core of a solenoid 26 by which the brake is released, the solenoid being in circuit with the battery 13 and the controller 21 in such manner that it is energized when current is supplied to the motor, thereby to cause the band 23 to disengage the drum 22 and is deenergized when the motor circuit is opened, thereby to permit the application of the band 23 upon the drum 22 by means of the spring 25.

The platform 2 is provided at its rear end with means for guiding the cable 14 and maintaining its alinement with the drum 15, such means functioning in any position of said platform. As shown and preferred the cable guiding means consists of a pair of sheaves 27 and 28 located in a common vertical plane and a pair of guide rollers 29 arranged in front of the sheaves 27 and 28. The sheave 27 is arranged directly above the sheave 28; these sheaves permit easy movements of the cable but maintain its alinement. The rollers 29 are arranged on parallel vertical axes and their pass registers with the pass of the sheaves 27 and 28. The rollers 29 are preferably concaved whereby their pass diminishes in width from its center to its ends in order to maintain the alinement of the cable with the pass of the sheaves 27 and 28 for some distance in advance of said sheaves and thus prevent any binding effect. The cable 14 extends above the shaft 12 which is provided with an anti-friction sheave 30 arranged in a common vertical plane with the sheaves 27 and 28 and which is engaged by the cable 14 when the elevation of the platform is such that the cable would otherwise wear on the shaft 12.

The axles of the sheaves 27 and 28 are mounted in upright brackets 31 preferably of angle iron form and providing support for upper and lower horizontal brackets 32 in which the axles of the rollers 29 are journalled. The brackets 31 are secured at their lower ends to an angle iron or equivalent member 33 mounted on the platform 2 and at their upper ends are braced to one another by a bar 34 and to the shaft 12 by suitable tension members 35 by which they are prevented from yielding under the pull of the load.

In use the platform 2 is elevated to the level of the table or other support for the object to be moved and the hook 16 is engaged with the sling at the proximate side of the load. The drum 15 is then operated by its motor 18 to take up the cable and thus draw the load upon the platform. Or, if desired, the hook 16 can be omitted and a tackle block employed, the hook of such block being engaged with the sling and the cable, trained over the pulley of the block, having its end secured in any suitable manner to the bar 34, the drum 15 being operated to take up the cable and thus draw the object upon the platform. When the load has been placed upon the platform the operation of the motor 18, and hence of the drum 15, is discontinued. Before moving the truck the platform should be lowered either all the way or sufficiently to eliminate any possibility of tipping or undue side sway due to irregularities in the floor or the presence of small obstacles over which the truck may be driven and in such lowering of the platform the cable 14 is unwound from the drum to the extent required, backlash being prevented by the brake mechanism. The truck is then driven in the usual manner to the point where the load is to be discharged and the platform is thereupon moved to the elevation of the table or other support upon which the load is to be moved. The drum 15 is then operated to pay out a suitable length of the cable 14 and said cable is then fitted to one or more suitably placed snatch blocks (not shown) connected to any stationary supporting means and the hook 16 is engaged with the sling at the remote side of the load. The drum 15 is then operated to take up the cable and hence to draw the load from the platform to the support. When the load has thus been discharged the cable 14 is disengaged from the snatch block and the truck is ready for further operation in the manner described.

Having fully described my invention, I claim:

1. A tiering truck having a vertically movable load carrying platform and operating means for said platform in combination with a load moving cable and guide means for said cable mounted at the inner end of said platform and comprising a pair of sheaves arranged in a common vertical plane and between which the cable is movable and a pair of rollers mounted in advance of said sheaves with their pass alining with the pass of said sheaves.

2. A tiering truck having a vertically movable load carrying platform, a pair of cantilever arms projecting rearward from said platform, vertical guide rails, rollers engaging the front and rear faces of said guide rails, shafts for said rollers mounted in said arms and means for operating said platform including an element connected to said arms in combination with a load moving cable, a winding drum for said cable mounted on the frame of said truck and guide means for said cable mounted at the inner end of said platform and including a pair of sheaves arranged in a common vertical plane and between which the cable is movable, upright supporting brackets for said sheaves, and means for bracing said brackets to one of said shafts.

3. A tiering truck having a vertically movable load carrying platform and operating means for said platform in combination with a load moving cable and guide means for said cable mounted at the inner of said platform and including a pair of sheaves arranged in a common vertical plane and between which the cable is movable, upright supporting brackets for said sheaves, and a bar connecting said brackets at their upper ends and thereby bracing them to one another.

4. A tiering truck having a vertically movable load carrying platform, a pair of cantilever arms projecting rearward from said platform, vertical guide rails, rollers engaging the front and rear faces of said guide rails, front and rear shafts for said rollers mounted in said arms and means for operating said platform including an element connected to said arms in combination with a load moving cable, a winding drum for said cable mounted on the frame of said truck, guide means for said cable mounted at the inner end of said platform, the cable passing above the rear shaft, and a sheave on said rear shaft for engagement by said cable in the position of said platform within the upper range of its movement.

In testimony whereof I affix my signature.

WILLIAM C. CARR.